United States Patent [19]
Hopkinson

[11] 3,714,468

[45] Jan. 30, 1973

[54] PULSED POWER SUPPLY SYSTEM

[75] Inventor: Eric C. Hopkinson, Houston, Tex.

[73] Assignee: Dresser Industries, Inc., Dallas, Tex.

[22] Filed: July 28, 1971

[21] Appl. No.: 166,791

[52] U.S. Cl...........307/252 J, 250/84.5, 307/252 M, 307/274, 307/275

[51] Int. Cl...........H03k 17/56

[58] Field of Search.......307/252 J, 252 M, 274, 275; 331/112; 250/84.5

[56] References Cited

UNITED STATES PATENTS 3,018,392 1/1962 Jones et al.........................307/274 X

*Primary Examiner*—John Zazworsky
*Attorney*—Robert W. Mayer et al.

[57] ABSTRACT

A DC source is coupled into a unijunction transistor relaxation oscillator with the output of the oscillator driving the gate of an SCR. The voltage pulse appearing on the anode of the SCR is transformer coupled into a voltage multiplier circuit, the output of which is connected between the ion source anode and cathode of an accelerator tube used for producing fast neutrons from the D-T reaction. Because SCR's are subject to latch-up, the circuit also has a transistor connected between the cathode of the SCR and ground with the base of the transistor being transformer coupled through a capacitor back to the anode of the SCR. As long as the SCR is operating normally, a portion of the negative pulse developed on the SCR anode is inverted and coupled to the base of the transistor, thus turning the transistor on and allowing the SCR current to flow to ground through the very small saturation resistance of the transistor. In the event of latch-up, the SCR no longer produces pulses, thereby removing the drive from the transistor leaving the transistor in a non-conducting state. Thus, a high impedance is presented between the cathode of the SCR and ground. The SCR will then recover to its non-conducting state. There is sufficient impedance on the SCR cathode, however, that it will try to turn on again from the gate drive supplied by the unijunction relaxation oscillator and thus a pulse will be produced to drive the transistor into conduction and the circuit will begin to operate in a normal mode.

9 Claims, 2 Drawing Figures

INVENTOR
ERIC C. HOPKINSON

William E. Johnson, Jr.

ATTORNEY

PULSED POWER SUPPLY SYSTEM

BACKGROUND OF THE INVENTION

This invention relates generally to a circuit for producing high voltage pulses and more specifically to an apparatus for producing high voltage pulses from a voltage multiplier circuit driven by a gated SCR circuit. It is well known in the art to use unijunction transistor relaxation oscillators to gate an SCR to produce high voltage pulses. It is also well known that the SCR can be prevented from latching up, i.e., going into conduction to such an extent that the gate no longer is able to exercise control, by the insertion of a resistor of fairly large value in the anode or cathode circuit. However, with such a device, the voltage drop across the resistor detracts from that appearing across the transformer primary and thus reduces the available drive to the output circuit.

It is therefore the primary object of this invention to provide a new and improved circuit for eliminating latch-up in a triggered SCR circuit;

It is another object of the invention to provide a new and improved circuit for producing high voltage pulses;

It is still another object of the invention to provide a new and improved high voltage source for use with an acceleration tube; and It is yet another object of the invention to provide a new and improved high voltage pulse source for use in producing high energy neutrons.

The objects of the invention are accomplished, broadly, by the provision of an SCR gated by a source of pulses wherein a portion of the generated anode voltage pulses on the SCR is coupled to a variable impedance in the cathode circuit of the SCR whereby the impedance is varied as a function of a high voltage pulse being generated in the anode circuit of the SCR to thus prevent latch-up.

Figure 1:
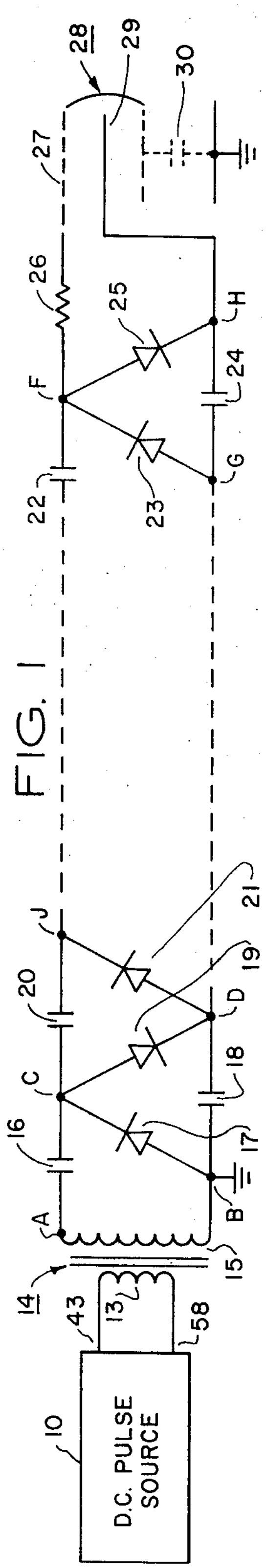
Figure 2:
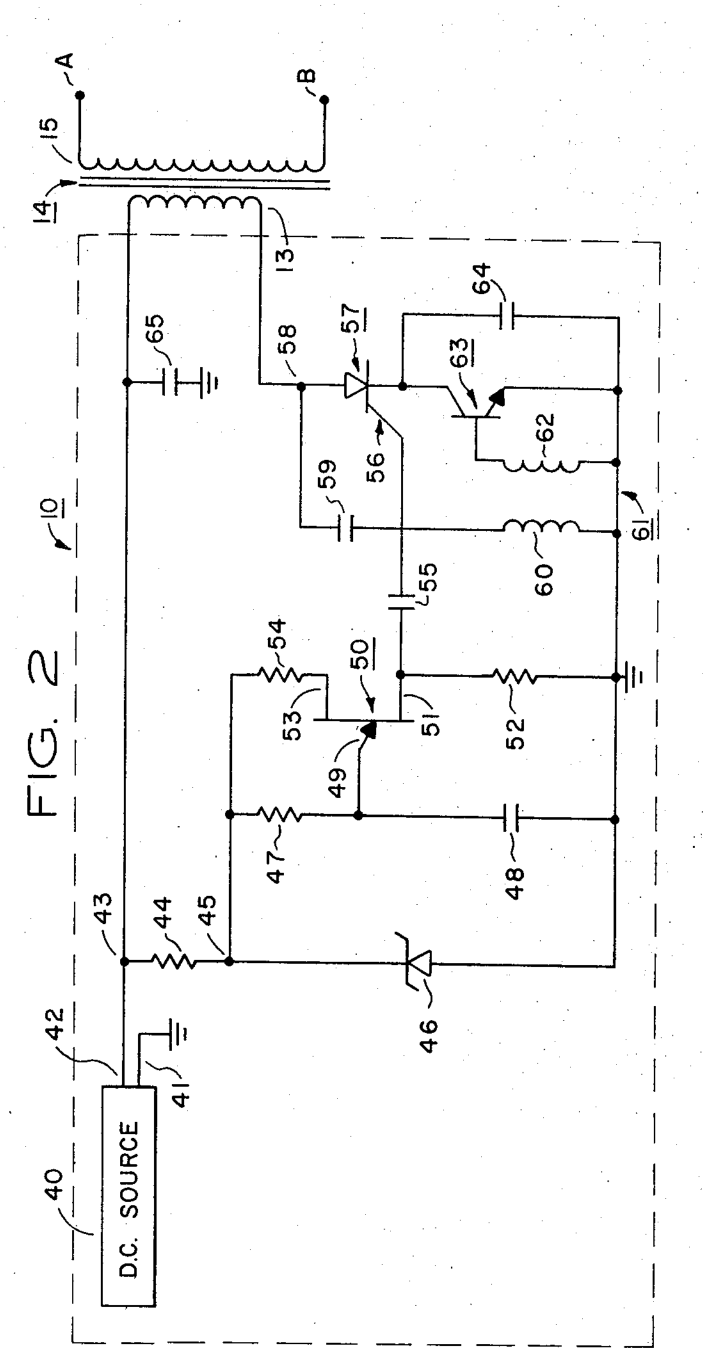

These and other objects, features and advantages of the present invention will be apparent to those skilled in the art from a careful reading of the following detailed specification and drawing, in which:

FIG. 1 is a schematic illustration of the circuitry according to the present invention; and FIG. 2 is a schematic illustration showing in greater detail the DC pulse source illustrated in block form in FIG. 1.

Referring now to the drawing in more detail, especially to FIG. 1, there is illustrated a DC pulse source 10, the outputs 43 and 58 of the source 10 being connected to the primary 13 of the transformer 14. The secondary 15 of the transformer 14 is connected into a conventional voltage multiplier circuit. The top section of the secondary of the transformer is connected to the junction A, the junction A being connected to junction C by means of the capacitor 16. The lower segment of the secondary 15 of the transformer is connected to junction B which is grounded. The anode of diode 17 is connected to junction B and the cathode of diode 17 is connected to junction C. Junctions B and D are connected together by means of capacitor 18. The anode of diode 19 is connected to junction C whereas the cathode of diode 19 is connected to junction D. Junctions C and J are connected together by means of capacitor 20. The anode of diode 21 is connected to junction D whereas the cathode of diode 21 is connected to junction J. The same type of connection of diodes and capacitors is carried out until a desired number of stages are connected together, the illustrated last stage being illustrated as having a capacitor 22 being connected to the junction F. The anode of diode 23 is connected to junction G whereas the cathode of diode 23 is connected to junction F also. The junction G is connected to junction H by means of capacitor 24. The anode of diode 25 is connected to junction F whereas the cathode of diode 25 is connected to junction H. The junction F is connected through resistor 26 to the cathode 27 of an ion source 28. The anode 29 of the ion source 28 is connected to junction H. The cathode 27 is illustrated as having a certain amount of interelectrode capacitance 30 between the cathode 27 and ground. It should be appreciated that such ion sources are known in the art for use with accelerator tubes useful in producing high energy neutrons, especially from the D-T reaction, and which are especially useful in radioactivity well logging. Examples of such prior art are shown in U.S. Pat. No. 3,309,522 to A. H. Youmans et al., issued Mar. 14, 1967 and U.S. Pat. No. 2,689,918 to A. H. Youmans, issued Sept. 21, 1954, each of which is assigned to the assignee of the present application.

In the operation of the circuit of FIG. 1, it should be appreciated that the voltage E appearing across the capacitor 16 is approximately equal in amplitude to the voltage appearing between points A and B on the transformer secondary. The voltage appearing across capacitor 18 is equal to 2E. The voltage appearing across capacitor 20 is equal to 3E. Further out in the circuit, the voltage appearing across the capacitor 22 is equal to (2N-1)E and the voltage appearing across the capacitor 24 is equal to 2NE, assuming no current supplied from the multiplier to the load, where E is the peak value of the input voltage, N is the number of stages and where two capacitors and two diodes comprise one stage.

If the multiplier is supplying current to a load, then the input voltage will be:

$$V=2NE-\frac{I}{fc}\left[\frac{2N^3}{3}+\frac{N^2}{2}-\frac{N}{6}\right]=2NE-\Delta V$$

where $f$ is the frequency of the input voltage, I is the load current, and $c$ is the capacitance of one of the capacitors 16, 18, 20, etc.

As the load current increases, the ripple voltage at the output will increase and will be determined by the expression $$\delta V=\frac{I}{fc}\frac{N(N+1)}{2}$$

so that the total voltage varies between the values $V\max=2NE-\Delta V$ and $V\min=2NE-\Delta V-\delta V$.

If the multiplier is energized from a source of high voltage pulses instead of an AC sine wave, then the output voltage will be composed of a DC component plus a pulsed component.

Referring further to FIG. 1, the highest potential of the voltage multiplier, appearing at junction H, is connected to the anode 29 of the accelerator tube, the cathode of the ion source being connected one-half stage further down through the resistor 26 to the junction F. By having enough stages, there is sufficient voltage developed across the diode 25 and of the correct polarity to ignite the ion source and produce positive ions within the accelerator tube. The remaining voltage between the ion source cathode 27 and ground is the acceleration voltage.

As the multiplier begins to supply current to the accelerator tube, the ripple will begin to increase and will appear, along with the DC component at the ion source anode and cathode. If a resistance 26 is inserted in the ion source cathode, the resistance in combination with the cathode capacitance to ground tends to integrate or filter the ripple portion pulses at the ion source cathode, leaving an excess of ripple at the anode.

By selecting the resistance 26 and value of capacitance for the multiplier consistent with the current requirements of the accelerator tube, a condition is attained whereby the ion source dumps its charge during the ripple pulse and extinguishes itself after the pulse has passed, thereby producing a burst of neutrons at a rate determined by the driving frequency. Although the resistor 26 will obviously have to be matched to the interelectrode capacitance 30 for a given accelerator tube, and the various capacitances within the multiplier circuit, its value is normally quite high, for example, 20 megohms.

Referring now to FIG. 2, the DC pulse source 10 illustrated in block diagram in FIG. 1 is shown in greater detail. A DC source 40, for example having an output of 150 VDC, is shown as having one of its outputs 41 grounded and the positive output terminal 42 connected to junction 43. The junction 43 is connected through resistor 44 to junction 45. A diode 46 is connected between the junction 45 and ground. Also connected between the junction 45 and ground is a unijunction transistor relaxation oscillator comprised first of a series combination of resistor 47 and capacitor 48, the junction of the resistor and the capacitor being connected to the emitter 49 of the unijunction transistor 50. The B1 base 51 of the transistor 50 is connected by means of resistor 52 to ground. The B2 base 53 of the transistor 50 is connected to junction 45 by means of resistor 54. The B1 base 51 is connected by capacitor 55 to the gate 56 of the SCR 57. The anode of the SCR 57 is connected to junction 58, which in turn is connected through capacitor 59 to the primary 60 of transformer 61, the other end of which is connected to ground. The secondary coil 62 of the transformer 61 is connected between ground and the base of transistor 63 whose emitter is grounded. The cathode of the SCR 57 is connected to the collector of transistor 63, the collector of transistor 63 also being connected to ground through capacitor 64. The junction 58 and junction 43 are connected to the transformer 14 as shown and described in FIG. 1. The junction 43 is also connected to ground by means of capacitor 65.

It should be appreciated that the unijunction transistor relaxation oscillator is known in the art, for example, as shown on page 46 of the *Silicon Control Rectifier Manual*, Second Edition, published by the Rectifier Components Department of General Electric Company, Auburn, N.Y. in 1961. It should furthermore be appreciated that the components used in FIGS. 1 and 2 herein are not especially critical as to valve. However, it has been found preferable that when using a 2N1777 for the SCR 57 and a MJ3011 power transistor available from the Motorola Semiconductor Company of Phoenix, Ariz. for the transistor 63 and a DC source 40 of 150 VDC, the capacitor 64 should preferably be at least 10 microfarads and even more preferably should be 14 microfarads.

In the operation of the circuit of FIG. 2, low voltage pulses from the unijunction transistor relaxation oscillator are coupled through the capacitor 55 to the gate of the SCR 57. With such an arrangement, pulses would normally be produced in the step-up transformer 14 of considerably higher voltage, for example at junction 58, than are coupled into the gate of the SCR 57. It should be appreciated, however, that since SCR's are susceptible to latching up, i.e., going out of control into a conduction mode which is not controllable by the gate, that after one or more pulses are coupled into the gate of the SCR 57, in the event the SCR does latch up, the pulse nature of the overall circuit is lost and no additional pulses will be coupled from the transformer primary 13 to the secondary 15.

With the circuit according to the present invention, a portion of the high voltage pulses are connected back from junction 58 through the capacitor 59 to the primary coil 60 with the transformer 61. This causes the pulses to be transformer coupled into the secondary coil 62 which is connected to the base of the transistor 63. This drives the transistor 63 into saturation and thus provides a lowering of the impedance between the cathode of the SCR 57 and ground. In the event the SCR should attempt to latch up, the SCR no longer produces pulses, thereby removing the drive from the base of the transistor 63, thus leaving the transistor 63 in a non-conducting or high impedance state. The SCR will then recover to its non-conducting state. There is sufficient impedance on the SCR cathode that it will try to turn on again from the gate drive from the capacitor 55 whereby a pulse will be produced at the junction 58 to again drive the transistor 63 into conduction and the circuit to begin to operate in its normal pulsed mode.

It should be appreciated that with such an overall circuit of FIGS. 1 and 2 having a DC source 40 of 150 VDC, there is generated high voltage pulses of between 15 and 20 KVDC at terminals A and B connected to the transformer secondary 15 and between 80 and 120 KVDC on the junction H which is connected to the anode 29 of the ion source 28.

While the preferred embodiment of the circuitry according to the present invention has been described and illustrated herein, various modifications will be apparent to those skilled in the art from a careful reading of the aforementioned embodiments. For example, instead of the transistor 63 being used as the variable impedance device in the cathode circuit of the SCR 57, one could if desired use other variable impedance devices, for example, a field effect transistor or another SCR or some other such gated device.

The embodiments of the invention in which an exclusive property or privilege is claimed are defined as follows:

1. A circuit for supplying high voltage pulses, comprising:

a source of low voltage pulses;

an SCR susceptible to latch-up having an anode, a cathode and a gate;

a DC voltage source connected to said anode;

means to couple said low voltage pulses to said gate to thus generate high voltage pulses on the anode of said SCR;

a transistor having a base, emitter and collector, said collector being connected to said cathode; and means to couple said high voltage pulses from said anode to said base and to block the coupling of the steady-state high voltage condition of said anode to said base to thereby prevent the latch-up of said SCR.

2. In a circuit having an SCR susceptible to latch-up having a gate, an anode and a cathode gated by low voltage pulses to generate high voltage pulses in the anode circuit of said SCR and having an impedance in the cathode circuit of said SCR, the improvement comprising means to vary said impedance in the cathode circuit of the SCR in a manner functionally related to a high voltage pulse being generated in the anode circuit of the SCR to thereby prevent the latch-up of the SCR.

3. The circuit according to claim 2 wherein said impedance is a transistor having an emitter, a base and a collector.

4. The circuit according to claim 3 wherein said means to vary said impedance comprises the functional coupling of said high voltage pulses into the base of said transistor to thereby saturate said transistor.

5. The circuit according to claim 4 wherein said high voltage pulses are transformer coupled into said transistor base.

6. The circuit according to claim 5 wherein a first capacitor is connected between the collector and emitter of said transistor.

7. The circuit according to claim 6 wherein said transformer coupling includes a transformer having a primary coil and a secondary coil and wherein a second capacitor is connected between the anode of said SCR and the primary coil of the transformer used in coupling said high voltage pulses to said base.

8. In a circuit for pulsing an ion source in an accelerator tube having a given interelectrode capacitance and given current requirements, wherein an SCR susceptible to latch-up having a gate, an anode and a cathode is gated by low voltage pulses to generate high voltage pulses in the anode circuit of said SCR and having an impedance in the cathode circuit of said SCR, the improvement comprising means to vary said impedance in the cathode circuit of the SCR in a manner functionally related to a high voltage pulse being generated in the anode circuit of the SCR to thereby prevent the latch-up of the SCR, a voltage multiplier circuit having a given ripple pulse frequency output, transformer coupling between the anode of said SCR and the input of said voltage multiplier circuit, and means coupling the output of said voltage multiplier circuit to said ion source.

9. The circuit according to claim 8, said coupling means being further characterized as including a resistor matched in value to said interelectrode capacitance and current requirements of the accelerator tube to cause the ion source to dump its charge during the ripple pulse and to extinguish itself after the ripple pulse has passed.

* * * * *